United States Patent [19]

Klafs et al.

[11] Patent Number: 4,967,879

[45] Date of Patent: Nov. 6, 1990

[54] LADDER

[75] Inventors: Ulrich Klafs; Carlheinz Mannhardt; Heinz Pecher, all of Weilheim; Oswald Riedl, Peissenberg, all of Fed. Rep. of Germany

[73] Assignee: Zarges Leichtbau GmbH, Wilheim, Fed. Rep. of Germany

[21] Appl. No.: 315,387

[22] Filed: Feb. 23, 1989

[30] Foreign Application Priority Data

Feb. 23, 1988 [DE] Fed. Rep. of Germany ... 8802330[U]

[51] Int. Cl.$^5$ ............................................. E06C 7/50
[52] U.S. Cl. ................................. 182/228; 182/194; 403/195
[58] Field of Search .................. 182/228, 194, 46; 403/195, 197

[56] References Cited

U.S. PATENT DOCUMENTS

| | | | |
|---|---|---|---|
| 2,989,141 | 6/1961 | Howard | 182/228 |
| 3,844,588 | 10/1974 | Jocsak | 403/197 |
| 3,914,061 | 10/1975 | Meyer | 403/197 |
| 4,597,687 | 7/1986 | Colas | 182/228 |
| 4,621,937 | 11/1986 | Maccuaig | 403/197 |

FOREIGN PATENT DOCUMENTS

| | | | |
|---|---|---|---|
| 829130 | 12/1969 | Canada | 182/228 |
| 1336343 | 7/1963 | France | 403/197 |
| 264096 | 6/1964 | Netherlands | 182/228 |

*Primary Examiner*—Reinaldo P. Machado
*Attorney, Agent, or Firm*—Robert W. Becker & Associates

[57] ABSTRACT

A ladder, especially for use in manholes, where the rungs are mounted in double-walled sidepieces via respective sleeves. Each sleeve has a body wall that, to uniformly support introduced forces, extends through both walls of a sidepiece and, especially from the outside, is arrested by connections between the rung and sleeve on the one hand and the sleeve and sidepiece on the other hand. At the same time, an outwardly directed base of the sleeve protects not only the rung but also the outer wall of the sidepiece.

14 Claims, 1 Drawing Sheet

LADDER

BACKGROUND OF THE INVENTION

The present invention relates to a ladder, especially for use in a manhole disposed in the ground, and has sidepieces with wall means that are provided with holes for rungs, whereby each rung is connected with a sidepiece via a sleeve that is disposed in one of the holes, with the sleeve having a base or end and, connected thereto, a sleeve body wall that is adapted to extend about the rung.

It is known to construct a ladder of sidepieces and rungs, with the connection between the rungs and sidepieces being effected by respective sleeves. The known sleeves can be produced pursuant to an injection molding process during the manufacture of the ladder. However, this manufacturing process is not suitable when hollow sections are used for the sidepieces. In order to achieve a permanent securement, the connections between the rungs and the sidepiece must on the one hand protect against withdrawal, and on the other hand must be rigid.

It has therefore already been proposed to effect connection of metallic sleeve-like intermediate pieces with the rungs and sidepieces by welding, riveting, or screw connections. However, ladders produced in this manner are relatively expensive.

Pursuant to a further proposed solution, it is known to replace the sleeve with an insert of elastic material, with mounting of the rung being effected on only the inner wall of the sidepiece and with a projection of the insert extending into an appropriate recess in the outer wall of the sidepiece. However, this ladder has not proven satisfactory in practice since the reliability against withdrawal of the rungs cannot be assured to a sufficient extent, and in addition no permanent rigid or twist-resistant mounting results, so that the ladder becomes unstable in a relatively short period of time. Furthermore, such a construction does not lend itself to automatic manufacture, since a surprisingly large number of rejects are produced.

It is furthermore known to make the sleeve that is used for the connection between the rung and the sidepiece in two parts, with one part being inserted from the outside into the rung hole of the sidepiece, and the other part being inserted from the inside. The sleeve part on the rung side is pressed over the rung, with the rung being deformed by an inwardly projecting edge. In addition, a force fit is established between the two parts of the sleeve. This is intended to produce a strong connection.

However, a drawback of this known sleeve is that again a relatively expensive configuration of the sleeve connection is provided, since during the manufacture two parts must be manipulated per rung connection, and in addition the pressing-on requires special tools. Furthermore, due to the deformation of the rung, the material is weakened, thus requiring a rung that comprises an extruded section to have relatively thick walls.

It is therefore an object of the present invention to provide a ladder of the aforementioned general type that is economical to produce, that offers an improved stability despite the fact that it has relatively thin parts, and that in addition provides the possibility of being able to mechanically carry out the rung/sidepiece connection without having a large number of rejects being produced thereby.

BRIEF DESCRIPTION OF THE DRAWING

This object, and other objects and advantages of the present invention, will appear more clearly from the following specification in conjunction with the accompanying schematic drawing, in which.

SUMMARY OF THE INVENTION

Figure 1:
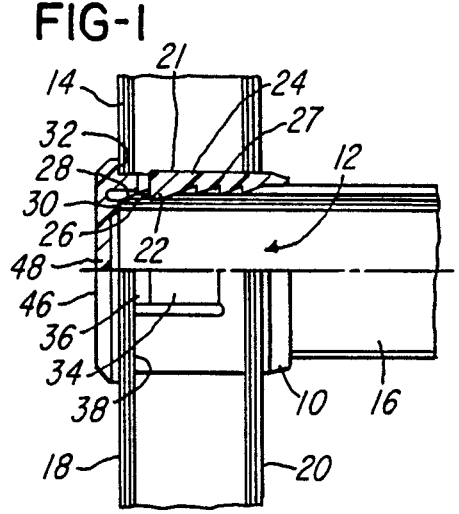
FIG. 1 is a partially cross-sectioned view through one exemplary embodiment of the inventive sleeve that has been installed in a ladder.

The ladder of the present invention is characterized primarily in that the sleeve body wall extends through the sidepiece, and in particular through the two walls thereof, with a support of the rung on the sidepiece being uniformly effected in the walls thereof via the sleeve body wall.

Due to the fact that the body wall of the sleeve is allowed to extend through both walls of the sidepiece, the sleeve can initially be pushed in with a single thrust, so that no tilting results. Particularly expedient is the increased stability that is obtained hereby at the same time, because the possibility is provided for the rung, via appropriate portions of the sleeve body wall, to be reliably supported on both walls of the sidepiece, thereby considerably improving the resistance of the ladder to twisting effects. And yet by using a true sleeve, the rung is protected toward the outside by the end face of the sleeve, with this end face, which extends beyond the outer wall of the sidepiece, at the same time also offering protection against impact for the outer wall of the sidepiece when the ladder is handled roughly. The sleeve is preferably made of a material that permits the required elastic yield, yet has a good permanent rigidity and inherent stability.

In addition, with the inventive sleeve there is above all no deformation of the rung that weakens the material. Accordingly, the thickness of the material can be such that the stability in the step area is assured without having to overdimension the pertaining parts. Furthermore, the circumferential press fitting of the sleeve stabilizes the end region of the rung. The securement is also reliable against withdrawal, since due to the press fitting, in conjunction with the arresting action, possibly with an additional grooving being provided on that side of the rung that faces the arresting tongue, the rung itself cannot be pulled out of the sleeve.

Pursuant to one advantageous specific embodiment of the present invention, the sleeve is inserted into the sidepiece from the outside. In so doing, already in principle, due to the corresponding engagement surfaces, the sleeve cannot be pulled through the rung hole in the sidepiece to the inside, so that here also protection against removal is provided. In addition, this also results in a non-detachable retention for the sleeve itself, since due to the press fitting the sleeve is pressed not only from the inside against the wall or walls of the sidepiece, but also against the rung.

The inventive construction furthermore provides the possibility of being able to mechanically produce the rung/sidepiece connection. For this purpose, the sidepieces are provided with the rung openings in conformity with the desired positioning of the rungs. The inventive sleeves are then prefabricated, for example pursuant to a plastic injection molding process, and the rungs, for example in the form of an extruded aluminum section, are cut to the desired length. The rungs are then placed into partially introduced sleeves against appropriate guide surfaces thereof that at the same time center the end of the rung in the sleeve. By pressing the oppositely disposed outer surfaces of the sleeves on both sidepieces of the ladder over the entire length thereof, it is possible in a single operation to finish the ladder, whereby on both sides of each rung the sleeves are simultaneously pushed over the rung and into the respective rung hole in the sidepiece, and the respective press fit and/or interlocking connection via the arresting tongue against the rung is effected. The insertion process is effected in conformity with the pressing forces, which can be established by determining the press fitting of the sleeve/sidepiece and sleeve/rung.

With double-walled sidepieces, the possibility is provided of having a detent, which prevents the sleeve from falling out, act upon either the inner wall, i.e. that wall that faces the rung, or on the outer wall. If the detent is provided on the inner wall, the sleeve is already held in a non-detachable manner when the rung is introduced into the sleeve to such an extent that the sleeve can no longer be pressed together by an amount equal to the height of the detent. Accordingly, with this embodiment, by appropriate configuration of the pressing forces for the automatic manufacture during pressing-in of the sleeve, the sleeve must be completely introduced into the rung hole prior to initiating introduction of the rung into the sleeve. In contrast, if the detent is provided on the outer wall of the sidepiece, the rung can already be introduced quite far into the sleeve before the detent catches.

The sleeve of the present invention is also suitable for so-called conical or flared ladders i.e., for ladders where the sidepieces extend at least partially toward one another from the bottom toward the top. For this purpose, it is expedient for the sleeve body to be embodied in the same manner as with a right-angled rung/sidepiece connection, with a rung hole being provided in the sidepieces that is parallel to the rung. Although it is in principle possible to use the same sleeves for right-angled as well as for tilted rung/sidepiece connections, it is advisable, in order to achieve a support for the outer abutment surface of the sleeve all the way around on the outer wall of the sidepiece, to tilt the sleeve relative to a vertical line in conformity with the angular position of the sidepiece, in which connection an appropriate tilting is also provided for the detent on the side of the sidepiece if this detent does not have a horizontal orientation.

Relatively high pressing forces can be provided in a particularly advantageous manner by practically securing the sleeve in the rung hole by having the entire periphery of the sleeve rest against this hole, thereby exerting a pressing force upon the rung that corresponds to the oversizing of the sleeve in the gap between the rung hole and the rung, whereby relatively hard plastics can expediently be used.

Depending upon the desired application for the ladder, a plastic that is resistant to temperature is preferred, i.e. a plastic that does not tend to exhibit brittle properties at low temperatures. Appropriate plastics can be used, for example, when the inventive ladder is to be used in manholes. Expedient in this connection is the need for relatively small amounts of plastic, so that the inventive ladders can be manufactured more expediently than aluminum ladders that have no sleeves and have the rungs flanged thereon, with the inventive ladders also tending to be considerably more economical than solid plastic ladders that must satisfy similar specifications.

Further specific features of the present invention will be described in detail subsequently.

DESCRIPTION OF PREFERRED EMBODIMENTS

Referring now to the drawing in detail, the sleeve 10 illustrated in FIG. 1 is accommodated in a hole 12 in a sidepiece 14 and embraces a rung 16. In the installed state, the rung 16 extends through an outer wall 18 of the sidepiece 14 as well as through an inner wall 20 of the sidepiece 14 that faces the rung 16. The gap between the rung hole 12 and the rung 16 is completely filled at both walls 18 and 20 of the sidepiece 14 by the wall 21 of the body of the sleeve 10, so that the rung 16 is supported against both walls 18 and 20.

The sleeve 10 is provided with a locking or arresting tongue 24 on which is formed a projecting portion 22 that faces the rung 16. The projection portion 22 is provided with an outwardly directed stop or arresting surface 26 that acts against removal of the rung 16 from the rung hole 12; in the illustrated embodiment, this is effected by having the arresting surface 26 mesh with a saw-tooth grooving 27 on that surface of the rung 16 that faces the arresting tongue 24. In so doing, an interlocking or positive connection is achieved between the sleeve 10 and the rung 16. The sleeve 10 is furthermore provided with an end abutment surface 28 that extends all the way around and against which rests one end face 30 of the rung 16. The connection of the end face 30 with the end abutment surface 28, and the connection of the arresting surface 26 with the grooving 27, cooperate in such a way that the sleeve 10 is thereby positively and securely held upon the rung 16.

The sleeve 10 is also provided with an abutment surface 32 that rests against the outer surface of the outer wall 18 of the sidepiece 14 when the sleeve 10 is inserted into the rung hole 12. To reliably secure the sleeve 10 in the sidepiece 14, a resilient tongue 34 is provided that is integrally formed with the sleeve 10; the resilient tongue 34 is provided with a detent 36 that acts against an engagement surface 38 on the inside of the outer wall 18 of the sidepiece 14. The configuration of the detent 36 is such that the gap between the outer wall 18 and the rung 16 is less than the height of the detent 36, so that when the rung 16 is inserted, removal of the sleeve 10 from the rung hole 12 is reliably prevented.

The embodiment illustrated in FIG. 1 shows a detent 36 for the interlocking support of the sleeve 10 against the sidepiece 14, and an arresting tongue 24 for the interlocking support of the sleeve 10 against the rung 16. In actuality, however, a further detent 36 and a further arresting tongue 24 are provided on respectively opposite walls of the sleeve 10. In this connection, it is expedient to have the detents and arresting tongues offset by 90° from one another, so that the arresting tongues 24 are each provided in horizontal regions of the sleeve 10, while the detents 36 are each provided in vertical regions of the sleeve 10. It would also be possible to transpose the positions of the detents and arresting tongues if the same sleeve body is to be used both for vertical and flared ladders.

Figure 2:
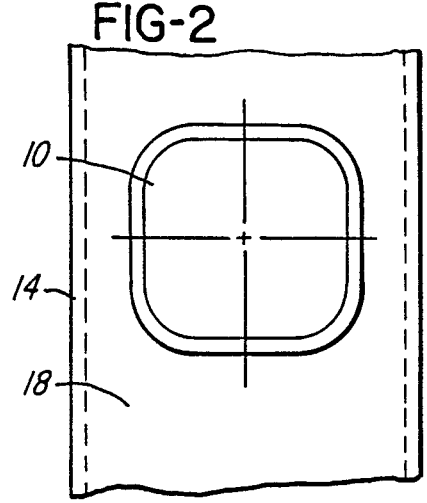
FIG. 2 is a plan view from the outer side of the sleeve of FIG. 1.

FIG. 2 shows how the sleeve 10 is disposed in the walls 18, 20 of the sidepiece 14. In conformity with the arrangement of the rung 16, the axis of the sleeve 10, and the axis of the rung 16, which for this purpose is coaxial with the axis of the sleeve, are disposed in the center of the sidepiece 14. In so doing, the forces introduced via the rung 16 are uniformly absorbed by the sidepiece 14. The configuration of the sleeve 10 is adapted to the profile of the rung 16, whereby as illustrated in FIG. 2 a quadratic rung cross-sectional shape with rounded corners is used. If desired, an orientation of the sleeve 10 with the pertaining rung 16 can be undertaken that corresponds to the operating angle of the ladder. In this case, it is merely necessary to appropriately embody the rung hole 12 in order in this way to improve the ability to step on the ladder.

Figure 3:
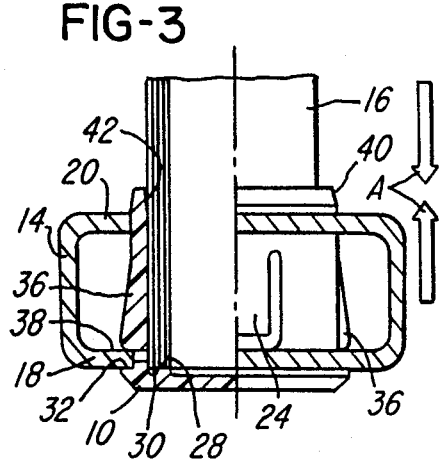
FIG. 3 is a partially cross-sectioned horizontal view of the sleeve of FIG. 1.

FIG. 3 shows in detail how the detent 36 is supported against the engagement surface 38 on the inside of the outer wall 18 of the sidepiece 14. As soon as the rung 16 is completely inserted into the sleeve 10, the sleeve is non-detachably held in the sidepiece 14.

As also shown in FIG. 3, that end of the sleeve 10 that faces the rung 16 is provided with a guide surface 40 that is directed toward the sidepiece 14, and a guide surface 42 that is directed toward the rung 16. Accordingly, at that end that faces the rung 16, both the inside and the outside of the sleeve 10 are slightly conically tapered. The fit of the guide surfaces 40 and 42 relative to the rung 16 and to the sidepiece 14 are such that during the insertion process, which requires that a force be exerted between the sleeve 10 and the rung 16 in the direction of the arrows A, first the sidepiece 14 slides over the guide surface 40 and already catches against the detent 38 before the penetration depth of the rung 16 in the sleeve 10 has reached the distance of the walls 18 and 20 of the sidepiece 14 from one another.

Figure 4:
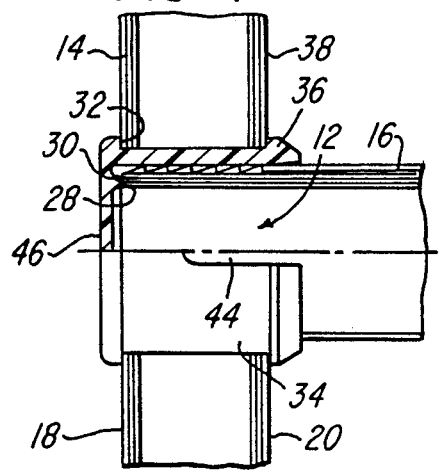
FIG. 4 is a partially cross-sectioned view of a further exemplary embodiment of the inventive sleeve.

FIG. 4 illustrates a further exemplary embodiment of the inventive sleeve, with the same reference numerals being used for comparable parts. This embodiment differs from the embodiment illustrated in FIGS. 1 to 3 merely in that the detent 36 acts upon an engagement surface 38 that is provided on the outside of the inner wall 20 of the sidepiece 14, i.e. on that side of the inner wall 20 that faces the rung 16. The configuration of the resilient tongue 34 is effected by providing slits 44 that extend in the direction of the axis of the sleeve 10; at least two, and preferably four, slits 44 are distributed about the periphery of the sleeve 10. As a result of the press fit between the rung hole 12 and the sleeve 10 on the one hand, as well as the sleeve 10 and the rung 16 on the other hand, the rung 16 is held in the sidepiece 14 in such a way as to prevent withdrawal thereof.

Advantageously, a micro-roughness of the plastic that is used for the sleeve 10 is provided; this roughness expediently has a depth of from 25 to 30 μm. This roughness additionally gives an attractive, dull appearance to an end surface 46 of the sleeve 10. By making the sleeve 10 of, for example, the plastic Hostaform F 9063, there results from the press fit an extraction force of 150 kp, which is sufficient to satisfy all requirements placed upon manhole ladders.

It is particularly expedient to support the end face 30 of the rung 16 against a sleeve base or end 48 that thus keeps the rung 16 from being pushed through the end, protects the end face 30 of the rung 16, and at the same time protects the outer wall 18 of the sidepiece 14, since the sleeve end 48 extends outwardly beyond the outer wall 18. Pursuant to the presently preferred embodiment of the present invention, the sleeve end 48 is closed off, so that in view of the press fit of the rung 16, the interior of the rung is practically airtight, which offers advantages with regard to protection against corrosion.

It should be understood that one or more openings could also be provided in the sleeve end 48 without forfeiting the support and protection functions of the sleeve end 48.

Pursuant to a further specific embodiment of the present invention, the sleeve can be inserted from the inside, whereby nevertheless the function of the sleeve end 48 is retained. The orientation of the detent 36 and the abutment surface 32 is then reversed, so that the abutment surface 32 is directed to the outside and the detent 36 is directed to the inside.

The present invention is, of course, in no way restricted to the specific disclosure of the specification and drawing, but also encompasses any modification within the scope of the appended claims.

What we claim is:

1. In a ladder having sidepieces with wall means that are provided with holes for rungs, whereby each end portion of a rung is connected with a sidepiece via a sleeve that is disposed in a rung hole, with said sleeve having a base and, connected thereto, a sleeve body wall that is adapted to extend about said end portion of said rung, the improvement therewith wherein:

said sleeve body wall extends through said wall means of said sidepiece, with a support of said rung on said sidepiece being uniformly effected in said wall means thereof via said sleeve body wall, said wall means of said sidepiece including an inner wall that faces said rung, and an outer wall that is remote from said rung; said sleeve being provided with at least one detent means, which catches against one of said walls of said sidepiece, said detent means being resiliently prestressed.

2. A ladder according to claim 1, in which said detent means is directed toward said outer wall of said sidepiece.

3. A ladder according to claim 2, in which said sleeve is embodied as a single piece and is introduced into said sidepiece from an outer side of said ladder.

4. A ladder according to claim 1, in which said sleeve is provided with an abutment surface that forms a stop for that surface of said outer wall of said sidepiece that faces away from said rung.

5. A ladder according to claim 1, in which said sleeve, when inserted in said sidepiece, extends about said rung with a press fit that at most causes a resilient deformation of said rung.

6. A ladder according to claim 1, in which said rung extends into said sleeve to such an extent that said rung braces said body wall of said sleeve against said outer wall of said sidepiece from the interior of said sleeve.

7. In a ladder having sidepieces with wall means that are provided with holes for rungs, whereby each end portion of a rung is connected with a sidepiece via a sleeve that is disposed in a rung hole, with said sleeve having a base and, connected thereto, a sleeve body wall that is adapted to extend about said end portion of said rung, the improvement therewith wherein:

said sleeve body wall extends through said wall means of said sidepiece, with a support of said rung on said sidepiece being uniformly effected in said wall means thereof via said sleeve body wall, said wall means of said sidepiece including an inner wall that faces said rung, and an outer wall that is remote from said rung; said sleeve being provided with at least one detent means, which catches against one of said walls of said sidepiece, said sleeve being provided, as an integral component thererof, with an arresting tongue that is resiliently prestressed in a direction toward said rung; and in which integrally formed on said arresting tongue is a projection that is directed toward said rung.

8. A ladder according to claim 7, in which said rung, on a surface thereof that is directed toward said arresting tongue, is provided with a grooving having catching surfaces directed outwardly toward said projection of said arresting tongue.

9. A ladder according to claim 8, in which said grooving of said rung has a saw-tooth configuration.

10. In a ladder having sidepieces with wall means that are provided with holes for rungs, whereby each end portion of a rung is connected with a sidepiece via a sleeve that is disposed in a rung hole, with said sleeve having a base forming a stop for said rung and, connected thereto, a sleeve body wall that is adapted to extend about said end portion of said rung, the improvement therewith wherein:

said sleeve body wall extends through said wall means of said sidepiece, with a support of said rung on said sidepiece being uniformly effected in said wall means thereof via said sleeve body wall, said wall means of said sidepiece including an inner wall that faces said rung, and an outer wall that is remote from said rung; said sleeve being provided with at least one detent means, which catches against one of said walls of said sidepiece, that end of said sleeve that faces said rung being provided with an inner cone as a first guide surface for introduction of said rung into said sleeve.

11. A ladder according to claim 10, in which that end of said sleeve that faces said rung is provided with an outer cone as a second guide surface for introduction of said sleeve into said rung holes of said walls of said sidepiece.

12. A ladder according to claim 11, in which said outer cone is formed on said detent means.

13. In a ladder having sidepieces with wall means that are provided with holes for rungs, whereby each end portion of a rung is connected with a sidepiece via a sleeve that is disposed in a rung hole, with said sleeve having a base and, connected thereto, a sleeve body wall that is adapted to extend about said end portion of said rung, the improvement therewith wherein:

said sleeve body wall extends through said wall means of said sidepiece, with a support of said rung on said sidepiece being uniformly effected in said wall means thereof via said sleeve body wall, said wall means of said sidepiece including an inner wall that faces said rung, and an outer wall that is remote from said rung; said sleeve being provided with at least one detent means, which catches against one of said walls of said sidepiece, said base of said sleeve forming a stop for said rung, which essentially extends to said outer wall of said sidepiece.

14. In a ladder having sidepieces with wall means that are provided with holes for rungs, whereby each end portion of a rung is connected with a sidepiece via a sleeve that is disposed in a rung hole, with said sleeve having a base and, connected thereto, a sleeve body wall that is adapted to extend about said end portion of said rung, the improvement therewith wherein:

said sleeve body wall extends through said wall means of said sidepiece, with a support of said rung on said sidepiece being uniformly effected in said wall means thererof via said sleeve body wall, said wall means of said sidepiece including an inner wall that faces said rung, and an outer wall that is remote from said rung; said sleeve being provided with at least one detent means, which catches against one of said walls of said sidepiece, said sleeve having an essentially cup-shaped configuration, with said base of said sleeve supporting and protecting said rung toward the outside, and at the same time extending outwardly beyond said outer wall of said sidepiece.

* * * * *